United States Patent [19]

Burgan et al.

[11] Patent Number: 5,499,019
[45] Date of Patent: Mar. 12, 1996

[54] METHOD AND APPARATUS FOR PROVIDING A DEMONSTRATION MODE IN A DATA COMMUNICATION RECEIVER

[75] Inventors: John M. Burgan, N. Palm Beach; George W. McClurg, Boynton Beach; Kenneth S. Lerner, Boca Raton, all of Fla.

[73] Assignee: Motorola, Inc., Schaumburg, Ill.

[21] Appl. No.: 288,859

[22] Filed: Aug. 11, 1994

[51] Int. Cl.$^6$ ..................................................... H04Q 1/00
[52] U.S. Cl. .................. 340/825.22; 340/825.44; 364/401; 434/365; 434/379
[58] Field of Search ................... 340/825.22, 825.44; 455/344, 38.1; 364/401; 434/365, 379; 379/96

[56] References Cited

U.S. PATENT DOCUMENTS

| | | | |
|---|---|---|---|
| 4,071,698 | 1/1978 | Barger | 379/96 |
| 4,247,947 | 1/1981 | Miyamoto | 455/38.1 |
| 4,604,064 | 8/1986 | Boehm | 434/379 |
| 4,670,798 | 6/1987 | Campbell | 360/12 |
| 4,949,257 | 8/1990 | Orbach | 364/401 |
| 5,166,886 | 11/1992 | Molnar | 364/479 |
| 5,237,157 | 8/1993 | Kaplan | 364/401 |
| 5,261,824 | 11/1993 | Ness | 434/379 |

FOREIGN PATENT DOCUMENTS 9203003   2/1992   WIPO ................................. 434/379

OTHER PUBLICATIONS

"GE's CAE International Opens ∂productivity[ centers"; Mini–Micro Systems (Sept. 1982) vol. 15, No. 9. p. 163.
"IBM Experiments with new medium for Generating Leay ds"; Direct Marketing (Nov. 1983) vol. 46 No. 7 p. 46–54.

Primary Examiner—Brian Zimmerman
Attorney, Agent, or Firm—Kelly A. Gardner; Daniel K. Nichols; John H. Moore

[57] ABSTRACT

A data communication receiver (100) for operating in a demonstration mode comprises a receiving circuit (110) for receiving and decoding radio frequency signals, a battery (140) for powering the receiving circuit (110), and a display (150) for displaying information. A switch (142) coupled between the battery (140) and the receiving circuit (110) disconnects the receiving circuit (110) from the battery (140) to disable the receiving circuit (110) when a signal has been received indicating that the data communication receiver (100) is to operate in the demonstration mode. A demonstration element (165, 170) coupled to the display (150) provides at least one demonstration screen to the display (150) in response to the disabling of the receiving circuit (110).

19 Claims, 4 Drawing Sheets

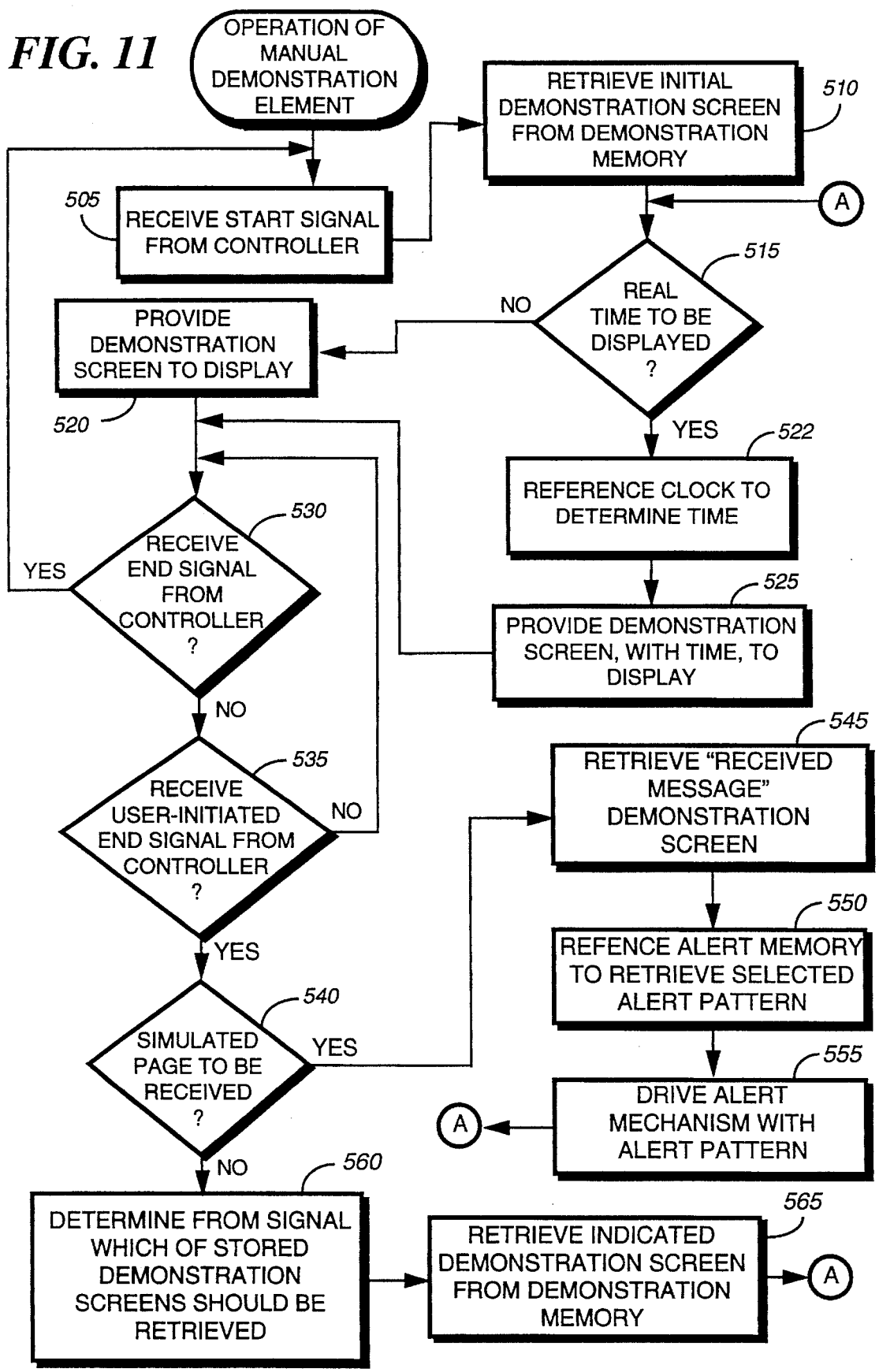

METHOD AND APPARATUS FOR PROVIDING A DEMONSTRATION MODE IN A DATA COMMUNICATION RECEIVER

FIELD OF THE INVENTION

This invention relates in general to data communication receivers, and more specifically to a data communication receiver have a display for displaying predetermined information.

BACKGROUND OF THE INVENTION

Some conventional electronic devices, such as calculators, can be enabled in retail stores such that potential customers can manipulate controls to operate the device and thereby determine whether or not they wish to purchase the device. However, it is not practical to allow this type of user operation during the retail sale of portable receiving devices, such as pagers, because pagers are typically powered by low capacity batteries that become quickly depleted during normal operation of the pager. As a result, a conventional pager that was placed on display such that the user could perform conventional pager operations would require frequent replacement of the battery, which can be inconvenient and relatively expensive. Furthermore, allowing a potential customer to turn on a conventional pager to determine whether he likes the operation of the pager would be useless because the pager cannot operate normally to receive messages unless messages are being transmitted by a terminal for reception by the pager. Therefore, without constant transmission of messages to a pager on display, a customer could not operate a displayed pager to receive and present messages.

Thus, what is needed is a method and apparatus for allowing a customer to operate a portable receiver without frequently depleting the battery and without requiring constant message transmissions to the portable receiver.

SUMMARY OF THE INVENTION

A data communication receiver for operating in a demonstration mode comprises a receiving circuit for receiving and decoding radio frequency signals, a battery for powering the receiving circuit, and a display for displaying information. A switch coupled between the battery and the receiving circuit disconnects the receiving circuit from the battery to disable the receiving circuit when a signal has been received indicating that the data communication receiver is to operate in the demonstration mode. A demonstration element coupled to the display provides at least one demonstration screen to the display in response to the disabling of the receiving circuit.

A data communication receiver includes a receiving circuit for receiving radio frequency signals and a display for presenting information. A method for providing a demonstration mode in the data communication receiver comprises the steps of disabling the receiving circuit, presenting, subsequent to the disabling step, a first predetermined screen of information on the display, and displaying, subsequent to the presenting step, a second predetermined screen of information on the display.

BRIEF DESCRIPTION OF THE DRAWINGS

FIG. 11 is a flowchart illustrating the operation of a manual demonstration element included in the data communication receiver of FIG. 1 in accordance with the present invention.

DESCRIPTION OF A PREFERRED EMBODIMENT

Figure 1:
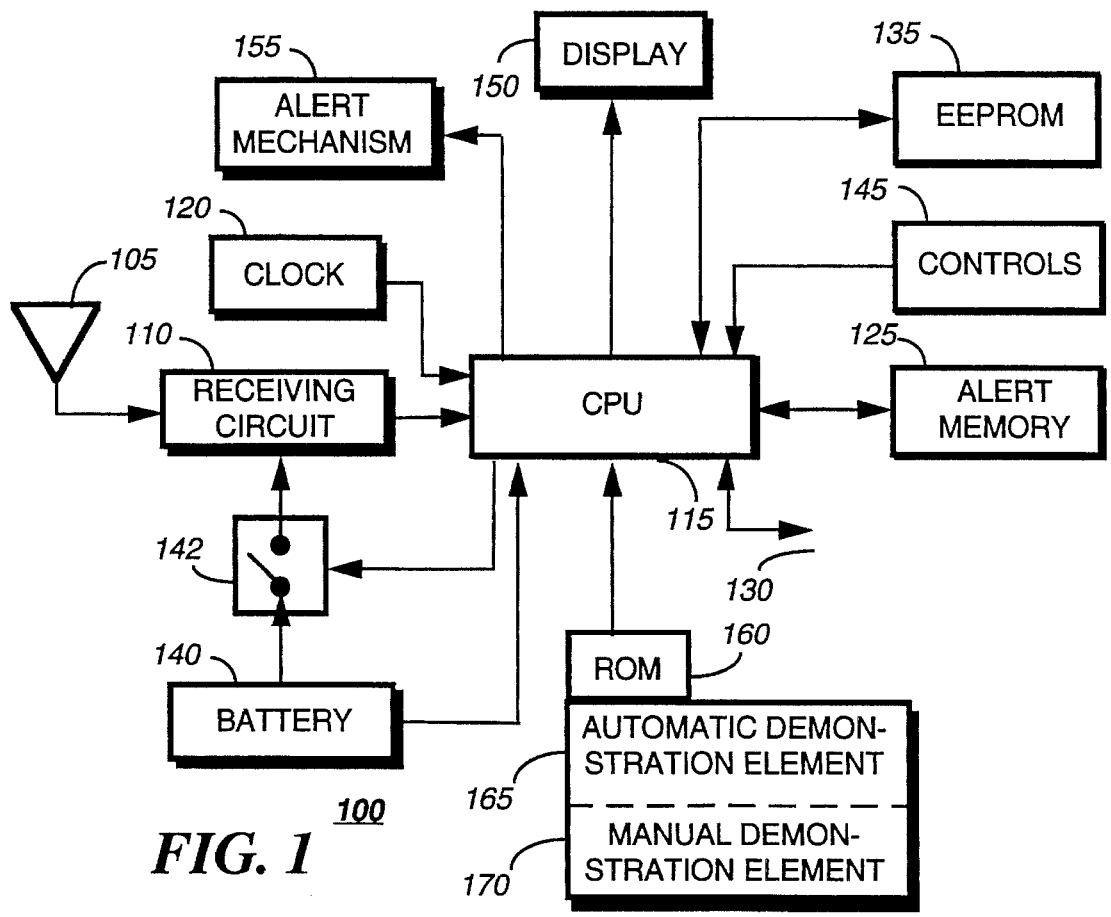
FIG. 1 is an electrical block diagram of a data communication receiver having a display in accordance with the present invention.

FIG. 1 is an electrical block diagram of a portable data communication receiver 100, such as a paging receiver, in accordance with the present invention. The data communication receiver 100 comprises an antenna 105 for receiving radio frequency (RF) signals and a receiving circuit 110 coupled to the antenna 105 for recovering messages from the RF signals. A controller 115 included in the receiver 100 controls the operation of the data communication receiver 100. The receiver 100 further includes a clock 120 for providing time values from which a real time can be determined, controls 145 for providing user inputs to the controller 115, and an alert mechanism 155, such as a transducer, for generating an audible alert in response to reception of a message. A battery 140 powers the portable data communication receiver 140, and a switch 142, which is coupled between the receiving circuit 110 and the battery 140 and which is controlled by the controller 115, enables and disables the receiving circuit 110.

An alert memory 125 coupled to the controller 115 stores a plurality of different alert patterns with which the controller 115 can drive the alert mechanism 155. A programmable memory, such as an electrically erasable programmable read only memory (EEPROM) 135, stores programmable receiver options and, in accordance with the present invention, can be programmed to place the receiver 100 in a demonstration mode. Further coupled to the controller 115 is a demonstration memory 130 for storing a plurality of predetermined demonstration screens including information that is presented in the demonstration mode and a display 150 for displaying messages received by the receiver 110 and screens stored in the demonstration memory 130. Another memory, such as a read only memory (ROM) 160, stores firmware elements for use in the receiver operation. Such firmware elements preferably include an automatic demonstration element 165 and a manual demonstration element 170.

According to the present invention, the portable data communication receiver 100 can be placed, through manipulation of the controls 145 or through programming of the EEPROM 135, in a demonstration mode in which various predetermined information is presented to the user on the display 150 and in which various alerts are audibly generated by the alert mechanism 155. In order to lessen the consumption of power from the battery 140 during the demonstration mode, the receiving circuit 110 is disabled by the controller 115 via the switch 142. As a result, during the demonstration mode, only circuits that require a relatively small amount of current are enabled so that the data communication receiver 100 can last for long periods of time, e.g., months or even years.

Conventional paging receivers, unlike the data communication receiver 100 according to the present invention, are unable to remain powered on for long periods of time without depleting the battery because the receiving circuits within the paging receivers cannot be disabled other than for normal battery saving operations during message reception. Therefore, use of a demonstration mode has not previously been suitable for use in conventional portable paging receivers which use a low capacity battery.

Figure 2:
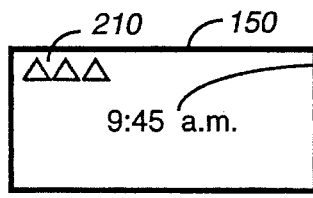
FIG. 2 is an illustration of a first demonstration screen for presentation on the display of FIG. 1 in accordance with the present invention.
Figure 6:
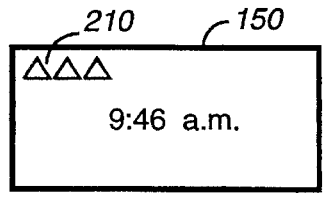
FIG. 6 is an illustration of a fifth demonstration screen for presentation on the display of FIG. 1 in accordance with the present invention.
Figure 3:
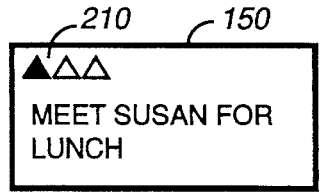
FIG. 3 is an illustration of a second demonstration screen for presentation on the display of FIG. 1 in accordance with the present invention.
Figure 4:
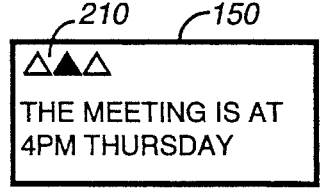
FIG. 4 is an illustration of a third demonstration screen for presentation on the display of FIG. 1 in accordance with the present invention.
Figure 5:
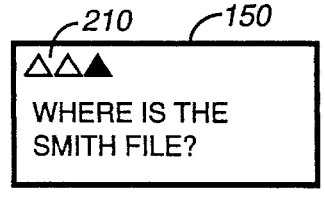
FIG. 5 is an illustration of a fourth demonstration screen for presentation on the display of FIG. 1 in accordance with the present invention.

FIGS. 2–9, illustrate examples of screens that can be presented, either automatically or manually, on the display 150 during the demonstration mode according to the present invention. As shown in FIG. 2, a first demonstration screen can, for instance, comprise a screen including a real time 205 and icons 210, which, during normal receiver operation, would represent a number of messages received by the receiver 100. For demonstration purposes, the icons 210 preferably represent a number of demonstration messages stored in the demonstration memory 130. During the manual demonstration mode, a potential customer can manipulate the controls 145 (FIG. 1) to display further demonstration screens. Alternatively, in the automatic demonstration mode, further demonstration screens can be presented automatically in response to the expiration of predetermined time periods. As shown in FIG. 3, a second demonstration screen can display a first of the demonstration messages, while highlighting a first of the icons 210 to indicate that the displayed message is the first of three stored messages. FIGS. 4 and 5 depict the presentation of second and third stored demonstration messages, respectively, along with the highlighting of the appropriate ones of the icons 210. After presentation on the display 150 of all of the demonstration messages, the receiver 100 can revert back to an "idle" demonstration screen, as shown in FIG. 6, in which the real time 205 and the icons 210 are presented.

Figure 7:
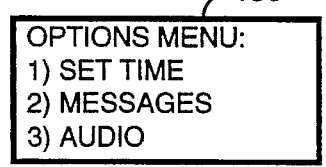
FIG. 7 is an illustration of a sixth demonstration screen for presentation on the display of FIG. 1 in accordance with the present invention.
Figure 8:
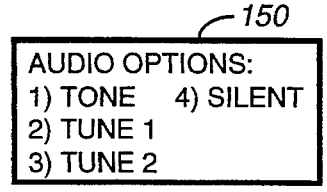
FIG. 8 is an illustration of a seventh demonstration screen for presentation on the display of FIG. 1 in accordance with the present invention.

It should be understood that FIGS. 2–6 depict examples of possible demonstration screens and that other types of screens can also be presented during the demonstration mode. By way of example, the receiver 100 can display options demonstration screens, as shown in FIGS. 7 and 8, which include menus of receiver options that can be set by the customer. In this manner, the potential customer can easily display messages, set options, and perform other operations to determine whether he desires to purchase the data communication receiver 100. Furthermore, this can be accomplished without depleting the battery 140 (FIG. 1) to any great degree because the high current receiving circuit 110 remains disabled during the demonstration mode.

Additionally, the demonstration mode according to the present invention conveniently allows a customer to display stored messages without requiring the transmission of any messages to the receiver 100 from a paging terminal. Therefore, the receiver 100 can be operated in the demonstration mode without requiring that the retailer pay for paging service from a service provider and without requiring that the retailer arrange to have messages constantly transmitted to the data communication receiver 100.

Figure 9:
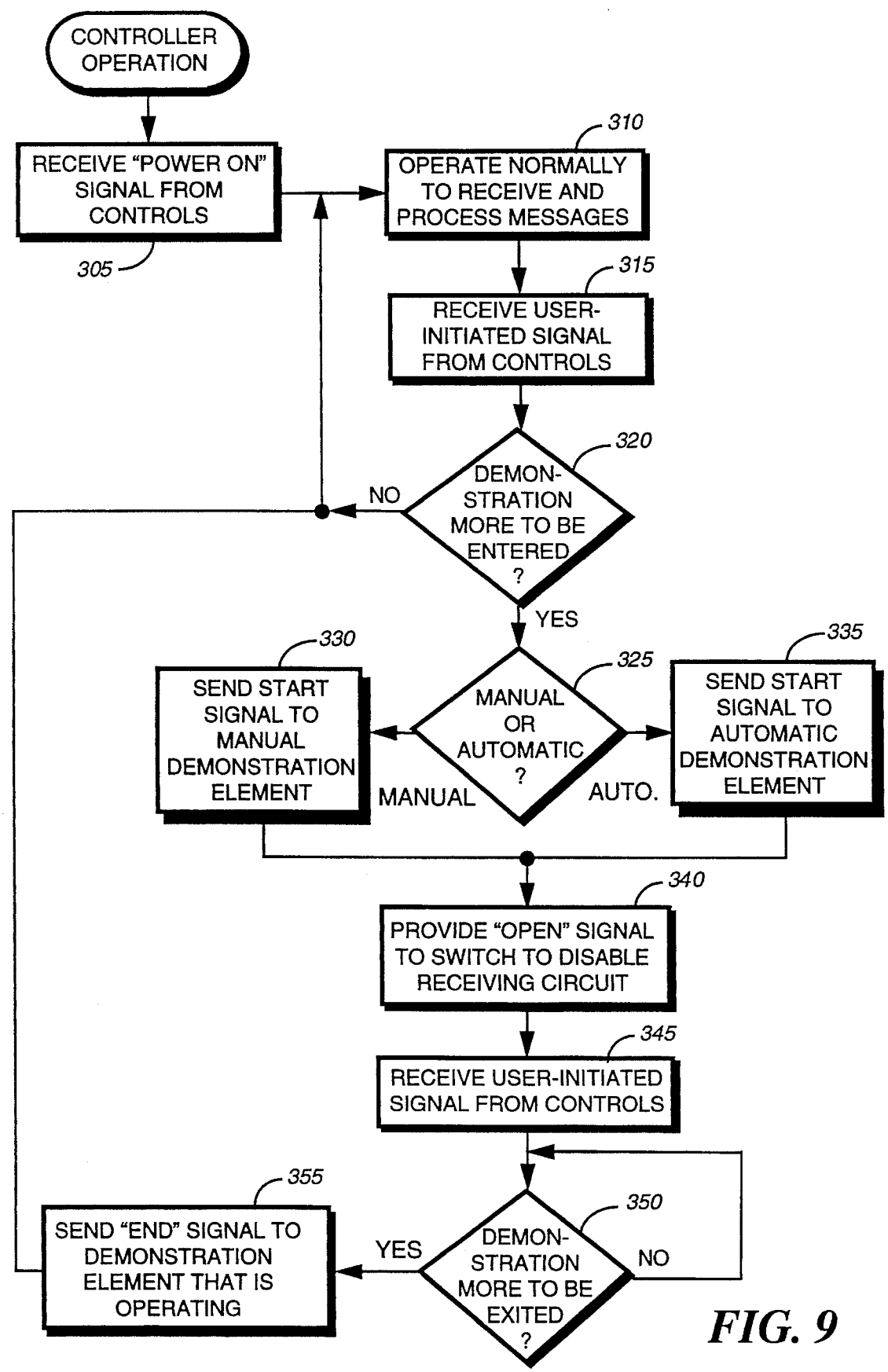
FIG. 9 is a flowchart depicting the operation of a controller included in the data communication receiver of FIG. 1 in accordance with the present invention.

Referring next to FIG. 9, a flowchart depicts the operation of the receiver controller 115 according to the present invention. At step 305, the controller 115 receives a "power on" signal from the controls 145 to indicate that the receiver 100 has been powered up. The controller 115 proceeds to operate normally, at step 310, until a further user-initiated signal is received from the controls 145, at step 315. At steps 320, 325, the controller 115 determines whether the signal indicates that the data communication receiver 100 has been placed in the demonstration mode and, if so, whether the demonstration mode is to be manual or automatic. When the receiver 100 has been placed in the manual demonstration mode, the controller 115 transmits, at step 330, a start signal to the manual demonstration element 170 (FIG. 1). Similarly, when the receiver 100 has been placed in the automatic demonstration mode, a start signal is transmitted, at step 335, to the automatic demonstration element 165. It will be appreciated that, in embodiments in which the receiver 100 is, by use of the EEPROM 135, programmed to power up in a particular demonstration mode, the controller 115 can automatically transmit the appropriate start signal without receiving and interpreting a user-initiated signal.

Next, at step 340, the controller 115 provides an "open" signal to the switch 142 to indicate that the receiving circuit 110 is to be disconnected from the battery 140, thereby disabling the receiving circuit 110. The receiver 100 continues to operate in the demonstration mode until reception, at step 345, of another user-initiated signal that indicates, at step 350, that the demonstration mode is to be exited. Thereafter, at step 355, the controller 115 transmits an "end" signal to the demonstration element 165, 170 that is in operation. The controller 115 then, at step 310, resumes normal operation during which the receiving circuit 110 is enabled to receive and decode radio frequency signals that include messages.

Figure 10:
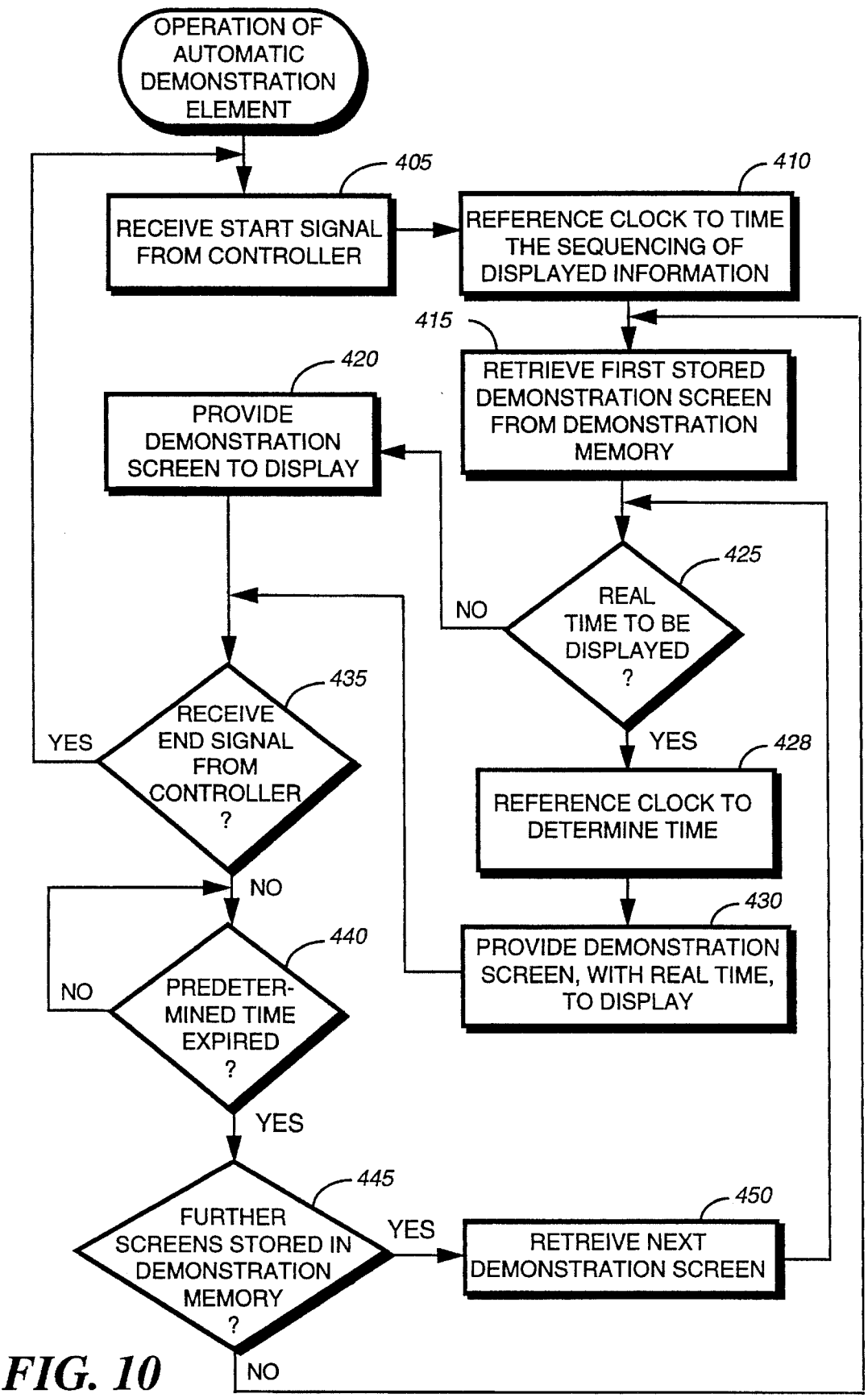
FIG. 10 is a flowchart depicting the operation of an automatic demonstration element included in the data communication receiver of FIG. 1 in accordance with the present invention.

FIG. 10 is a flowchart illustrating an example of the operation of the automatic demonstration element 165. According to the present invention, when the automatic demonstration element 165 receives, at step 405, the start signal from the controller 115, the clock 120 (FIG. 1) is referenced, at step 410, to time the sequencing of displayed information. Additionally, the automatic demonstration element 165 retrieves, at step 415, a first stored demonstration screen from the demonstration memory 130. When, at step 425, the real time is to be displayed as a portion of the demonstration screen, the clock 120 is further referenced, at step 428, to determine the real time. Thereafter, at step 430, the first demonstration screen is provided, along with the real time, to the display 150. When the real time is not included in the first demonstration screen, the demonstration screen alone is provided, at step 420, to the display 150. When, at step 435, an end signal has not been received from the controller 115, the automatic demonstration element 165 determines whether a predetermined time has expired, at step 440. When the time has expired, the automatic demonstration element 165 determines, at step 445, whether further demonstration screens are stored. When further screens are stored, a next demonstration screen is retrieved, at step 450, for presentation. When no further screens are stored in the demonstration memory 130 and when the end signal has not yet been received, the first stored screen is again retrieved, at step 415, for display to the customer in the demonstration mode.

In this manner, the data communication receiver 100 can be conveniently placed on display in an automatic demonstration mode in which predetermined screens of information are automatically presented in sequence. As a result, a potential customer can easily determine, without reference to a receiver manual, important information such as the amount of information which can be displayed, the different receiver features, e.g., real time display and audio options, and the manner in which received messages are indicated and presented. This can be accomplished, furthermore, without enabling the receiving circuit 110, resulting in an increased battery life, and without subscribing to a paging service such that messages are transmitted to the receiver 100.

Referring next to FIG. 11, an example of the operation of the manual demonstration element 170 (FIG. 1) is shown. According to the present invention, when, at step 505, the start signal is received, the manual demonstration element 170 retrieves, at step 510, an initial demonstration screen, which is provided to the display 150, at step 520. When, at step 515, the real time is to be displayed as a portion of the initial demonstration screen, the clock 120 is referenced, at step 522, to determine the real time. The real time and the demonstration screen are thereafter provided, at step 525, to the display 150. When, at step 530, an end signal has not been received by the controller 115, the manual demonstration element 170 waits for reception, at step 535 of a user-initiated signal.

When the user-initiated signal indicates, at step 540, that a simulated page is to be received, the manual demonstration element 170 retrieves, at step 545, a "received message" screen from the demonstration memory 130. Such a screen might, for example, include the words "NEW MESSAGE" on the display 150 and add a flashing icon to a plurality of previously displayed icons to indicate that a further message is now stored by the receiver 100. Preferably, the manual demonstration element 170 also references, at step 550, the alert memory 125 (FIG. 1) to retrieve an alert pattern for driving, at step 555, the alert mechanism 155. The alert pattern can be, for instance, a pattern that has been previously selected by programming of the EEPROM 135 or by user-programming during the demonstration mode.

When, at step 540, the signal does not indicate that a simulated page is to be received, the manual demonstration element 170 determines, at step 560, from the signal which of stored demonstration screens is to be retrieved, at step 565, from the demonstration memory 130. The screen to be retrieved can be indicated, by way of example, by the number or sequence of manipulations of the controls 145. As described above, the indicated screen could include an options screen, a real time screen, a message screen, an audio screen, a time-setting screen, and various other screens designed to inform a user of the features of the data communication receiver 100. The operation of the manual demonstration element 170 continues until, at step 530, an end signal is received from the controller 115.

The use of the manual demonstration mode advantageously allows a potential customer to manipulate the receiver controls 145 to display information in a manner similar to that displayed during normal operation of the receiver 100. Therefore, the customer can determine whether he likes the receiver features and the manners in which messages are displayed and options are set prior to purchasing the receiver 100. Additionally, this can be determined without having to enable the receiving circuit 110, which draws a relatively large amount of current, in order to wait for reception of a message that can be displayed. As a result, the data communication receiver 100, when in the demonstration mode, utilizes a relatively small amount of current and can therefore be maintained in the demonstration mode for long periods of time.

In summary, the data communication receiver as described above includes means for placing the receiver in a demonstration mode in which predetermined screens of information can be displayed to a potential customer. During this demonstration mode, high current circuitry, such as receiving circuits, are disabled so that the receiver consumes a minimal amount of current. As a result, the receiver can be placed in the demonstration mode for long times during which the receiver is displayed to customers without having to frequently replace the battery and without having to transmit messages to the data communication receiver.

It will be appreciated by now that there has been provided a method an apparatus for providing a demonstration mode in a portable data communication receiver.

What is claimed is:

1. A method for providing a demonstration mode in a data communication receiver including a receiving circuit for receiving radio frequency signals and a display for presenting information, the method comprising the steps of:

disabling the receiving circuit;

presenting, subsequent to the disabling step, a first predetermined screen of information on the display; and displaying, subsequent to the presenting step, a second predetermined screen of information on the display.

2. The method according to claim 1, further comprising, prior to the disabling step, the step of:

receiving a user-initiated signal indicating that the data communication receiver is to be placed in the demonstration mode.

3. The method according to claim 1, further comprising, prior to the disabling step, the step of:

determining that the data communication receiver has been programmed to operate in the demonstration mode.

4. The method according to claim 1, wherein the presenting step comprises the step of:

displaying a real time as a portion of the information included in the first predetermined screen.

5. The method according to claim 1, further comprising the steps of:

receiving, prior to the disabling step, a signal indicating that the data communication receiver is to operate in an automatic demonstration mode; and determining, prior to the displaying step, that a predetermined time has expired for presenting the first predetermined screen.

6. The method according to claim 5, further comprising the steps of: determining, subsequent to the displaying step, that the predetermined time has expired; and presenting, in response thereto, a further predetermined screen of information on the display.

7. The method according to claim 1, further comprising the steps of:

receiving, prior to the disabling step, a signal indicating that the data communication receiver is to operate in a manual demonstration mode; and receiving, prior to the displaying step, a user-initiated signal indicating that the second predetermined screen is to be displayed.

8. The method according to claim 7, further comprising the steps of:

receiving, subsequent to the displaying step, a further user-initiated signal indicating that a third predetermined screen of information is to be presented; and presenting the third predetermined screen.

9. A data communication receiver for operating in a demonstration mode, the data communication receiver comprising:

a receiving circuit for receiving and decoding radio frequency signals;

a battery for powering the receiving circuit;

a display for displaying information;

a switch coupled between the battery and the receiving circuit for disconnecting the receiving circuit from the battery to disable the receiving circuit when a signal has been received indicating that the data communication receiver is to operate in the demonstration mode; and a demonstration element coupled to the display for providing at least one demonstration screen to the display in response to the disabling of the receiving circuit.

10. The data communication receiver of claim 9, further comprising:

a controller coupled to the switch and the demonstration element for controlling the operation of the data communication receiver.

11. The data communication receiver of claim 10, further comprising:

a programmable memory coupled to the controller for sending the signal indicating that the data communication receiver is to operate in the demonstration mode.

12. The data communication receiver of claim 10, further comprising:

controls coupled to the controller and accessible to a user for sending the signal indicating that the data communication receiver is to operate in the demonstration mode, wherein the signal comprises a user-initiated signal.

13. The data communication receiver of claim 10, further comprising:

a memory coupled to the controller for storing the at least one demonstration screen.

14. The data communication receiver of claim 10, wherein the demonstration element comprises an automatic demonstration element.

15. The data communication receiver of claim 14, further comprising:

a clock coupled to the controller for generating time values, wherein the automatic demonstration element utilizes the time values to sequence the providing of the at least one demonstration screen to the display.

16. The data communication receiver of claim 10, wherein the demonstration element comprises a manual demonstration element.

17. The data communication receiver of claim 16, further comprising:

controls for receiving user-initiated signals in response to which the manual demonstration element provides the at least one demonstration screen to the display.

18. A data communication receiver for operating in a demonstration mode, the data communication receiver comprising:

a receiving circuit for receiving and decoding radio frequency signals;

a battery for powering the receiving circuit;

a display for displaying information;

a clock for generating real time values;

a switch coupled between the battery and the receiving circuit for disconnecting the receiving circuit from the battery to disable the receiving circuit when a signal has been received indicating that the data communication receiver is to operate in the demonstration mode; and an automatic demonstration element coupled to the display and the clock for automatically providing a plurality of demonstration screens to the display at predetermined times when the receiving circuit is disabled.

19. A data communication receiver for operating in a demonstration mode, the data communication receiver comprising:

a receiving circuit for receiving and decoding radio frequency signals;

a battery for powering the receiving circuit;

a display for displaying information;

controls for receiving user-initiated signals;

a switch coupled between the battery and the receiving circuit for disconnecting the receiving circuit from the battery to disable the receiving circuit when a signal has been received indicating that the data communication receiver is to operate in the demonstration mode; and a manual demonstration element coupled to the display and the controls for providing a plurality of demonstration screens to the display in response to reception of the user-initiated signals when the receiving circuit is disabled.

* * * * *